(12) United States Patent
Subramanya et al.

(10) Patent No.: US 9,092,607 B2
(45) Date of Patent: Jul. 28, 2015

(54) DYNAMIC FLOW CONTROL FOR ACCESS MANAGERS

(71) Applicant: Oracle International Corporation, Redwood Shores, CA (US)

(72) Inventors: Ramya Kukkehali Subramanya, Basaveshwaranagar (IN); Vikas Pooven Chathoth, Murgeshpalya (IN)

(73) Assignee: Oracle International Corporation, Redwood Shores, CA (US)

(*) Notice: Subject to any disclaimer, the term of this patent is extended or adjusted under 35 U.S.C. 154(b) by 63 days.

(21) Appl. No.: 13/632,559

(22) Filed: Oct. 1, 2012

(65) Prior Publication Data

US 2014/0096190 A1 Apr. 3, 2014

(51) Int. Cl.
*H04L 29/06* (2006.01)
*G06F 21/33* (2013.01)

(52) U.S. Cl.
CPC .............. *G06F 21/335* (2013.01); *H04L 63/08* (2013.01); *H04L 63/10* (2013.01); *H04L 63/20* (2013.01)

(58) Field of Classification Search
CPC .......... H04L 63/08; H04L 63/10; H04L 63/20
USPC ............................................................ 726/3
See application file for complete search history.

(56) References Cited

U.S. PATENT DOCUMENTS

| | | | | |
|---|---|---|---|---|
| 6,708,170 | B1 * | 3/2004 | Byrne et al. | 1/1 |
| 6,993,596 | B2 * | 1/2006 | Hinton et al. | 709/250 |
| 7,409,710 | B1 | 8/2008 | Uchil et al. | |
| 7,424,717 | B2 | 9/2008 | Blevins | |
| 7,848,834 | B2 | 12/2010 | Tecco et al. | |
| 2003/0074580 | A1 * | 4/2003 | Knouse et al. | 713/201 |
| 2003/0236977 | A1 * | 12/2003 | Levas et al. | 713/158 |
| 2004/0098614 | A1 * | 5/2004 | Chang et al. | 713/201 |
| 2004/0168090 | A1 * | 8/2004 | Chawla et al. | 713/201 |
| 2007/0130167 | A1 * | 6/2007 | Day et al. | 707/10 |
| 2007/0288890 | A1 * | 12/2007 | Wells | 717/113 |
| 2009/0254978 | A1 * | 10/2009 | Rouskov et al. | 726/4 |
| 2011/0055673 | A1 | 3/2011 | Teng et al. | |
| 2011/0093919 | A1 * | 4/2011 | Naslund et al. | 726/3 |
| 2011/0289160 | A1 * | 11/2011 | Sonkin et al. | 709/206 |
| 2013/0097686 | A1 * | 4/2013 | Towata | 726/9 |

OTHER PUBLICATIONS

Alex et al., Spring Security, Reference Documentation, retrieved on Feb. 21, 2012, 149 pages, http://static.springsource.org/spring-security/site/docs/3.1.x/reference/s . . . .

(Continued)

*Primary Examiner* — Dede Zecher
*Assistant Examiner* — Jason C Chiang
(74) *Attorney, Agent, or Firm* — Kilpatrick Townsend & Stockton LLP

(57) ABSTRACT

A master flow controller can branch to a dynamic flow controller for a specific event in an authentication process. The master flow controller saves the state of the plug-in execution before branching the control into the dynamic flow controller. All the attributes stored in the authentication context by the authentication plug-in is saved and synchronized before the control is branched to the child flow controller. After the dynamic flow controller finishes execution, the state information is synchronized between flow controllers.

20 Claims, 12 Drawing Sheets

(56) References Cited

OTHER PUBLICATIONS

The Trac Ticket Workflow System, The Default Ticket Workflow, retrieved on Feb. 21, 2012, 6 pages, http://trac.edgewall.org/wiki/tracworkflow.

Tivoli Access Manager, Version 5.1, Tivoli Access Manager Plug-in for Web Servers authentication, retrieved on Feb. 28, 2012, 1 page, http://publib.boulder.ibm.com/infocenter/tivihelp/v2r1/topic/com.ibm . . . .

* cited by examiner

DYNAMIC FLOW CONTROL FOR ACCESS MANAGERS

BACKGROUND OF THE INVENTION

Today's enterprises are facing access management challenges that require new levels of protection. For example, enterprises need to provide employees with access to company resources from personal mobile devices. Similarly, some organizations need to grant customers access to applications on the basis of the user's identities on social networking sites. And most organizations need to manage sign-on to cloud services as they would for on-premise applications. Further, organizations are being transformed by the need to provide end-to-end, standards-based security services to their applications, data, web services, and cloud-based or Software as a Service (SaaS) applications. Such business demands are driving organizations to externalize security services, integrate with partners, and evaluate the risk of internal and external transactions. Access management software attempts to addresses these challenges with solutions for controlling access to applications, data, web services, and cloud-based services across and beyond the enterprise.

Currently, access management software works with static pre-defined configurations for authentication workflows. While some access management software allows customers to plug-in custom authentication modules, this model still does not enable true extensibility of the authentication framework. The plug-ins still have to work with pre-defined events and do not get complete control over the authentication process allowing authentication plug-ins to define new workflows dynamically.

Accordingly, what is desired is to solve problems relating to authentication workflows for access management software, some of which may be discussed herein. Additionally, what is desired is to reduce drawbacks relating to authentication workflows for access management software, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, a master flow controller can branch to a dynamic flow controller for a specific event in an authentication process. The master flow controller saves the state of the plug-in execution before branching the control into the dynamic flow controller. All the attributes stored in the authentication context by the authentication plug-in is saved and synchronized before the control is branched to the child flow controller. After the dynamic flow controller finishes execution, the state information is synchronized between flow controllers.

In one embodiment, a method for managing authentication flows includes receiving information at a master authentication flow controller indicative of a predetermined event in an authentication flow handled by an authentication plugin to access a protected resource. Information is generated for the master authentication flow controller representing state of an authentication context associated with the authentication flow handled by the authentication plugin. A branch authentication flow is then initiated handled by a dynamic authentication flow controller for the predetermined event. Information is generated for the dynamic authentication flow controller representing state of an authentication context associated with the branch authentication flow handled by the dynamic authentication flow controller. State information is synchronized between the master authentication flow controller and the dynamic authentication flow controller at the point of the predetermined event. Information indicative of access to the protected resource can then be generated.

In some embodiments, generating the information representing state of an authentication context associated with the authentication flow handled by the master authentication flow controller prior to the predetermined event may include tracking events in the authentication flow. Generating the information representing state of an authentication context associated with the branch authentication flow handled by the dynamic authentication flow controller may include tracking events in the branch authentication flow. An authentication context may be persisted as a request cache in a database.

In further embodiments, receiving information at the master authentication flow controller indicative of the predetermined event in the authentication flow handled by the authentication plugin to access the protected resource may include receiving an instruction to pause the authentication flow together with an action instruction. The branch authentication flow may be determined based on the action instruction. The action instruction further may include a credential collection action.

In some aspects, one or more objects needed for the branch dynamic flow may be passed from the authentication plugin to the dynamic flow controller.

In one embodiment, a non-transitory computer-readable medium storing computer-executable code is provided for managing authentication flows. The non-transitory computer-readable medium includes code for receiving information at a master authentication flow controller indicative of a predetermined event in an authentication flow handled by an authentication plugin to access a protected resource, code for generating information for the master authentication flow controller representing state of an authentication context associated with the authentication flow handled by the authentication plugin, code for initiating a branch authentication flow handled by a dynamic authentication flow controller for the predetermined event, code for generating information for the dynamic authentication flow controller representing state of an authentication context associated with the branch authentication flow handled by the dynamic authentication flow controller, code for synchronizing state information between the master authentication flow controller and the dynamic authentication flow controller at the point of the predetermined event, and code for generating information indicative of access to the protected resource.

In a still further embodiment, a system for managing authentication flows includes a processor and a memory in communication with the processor and configured to store a set of instructions which when executed by the processor cause the processor to receive information at a master authentication flow controller indicative of a predetermined event in an authentication flow handled by an authentication plugin to access a protected resource, to generate information for the master authentication flow controller representing state of an authentication context associated with the authentication flow handled by the authentication plugin, to initiate a branch authentication flow handled by a dynamic authentication flow controller for the predetermined event, to generate information for the dynamic authentication flow controller representing state of an authentication context associated with the branch authentication flow handled by the dynamic authentication flow controller, to synchronize state information between the master authentication flow controller and the dynamic authentication flow controller at the point of the predetermined event, and to generate information indicative of access to the protected resource A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Figure 1:
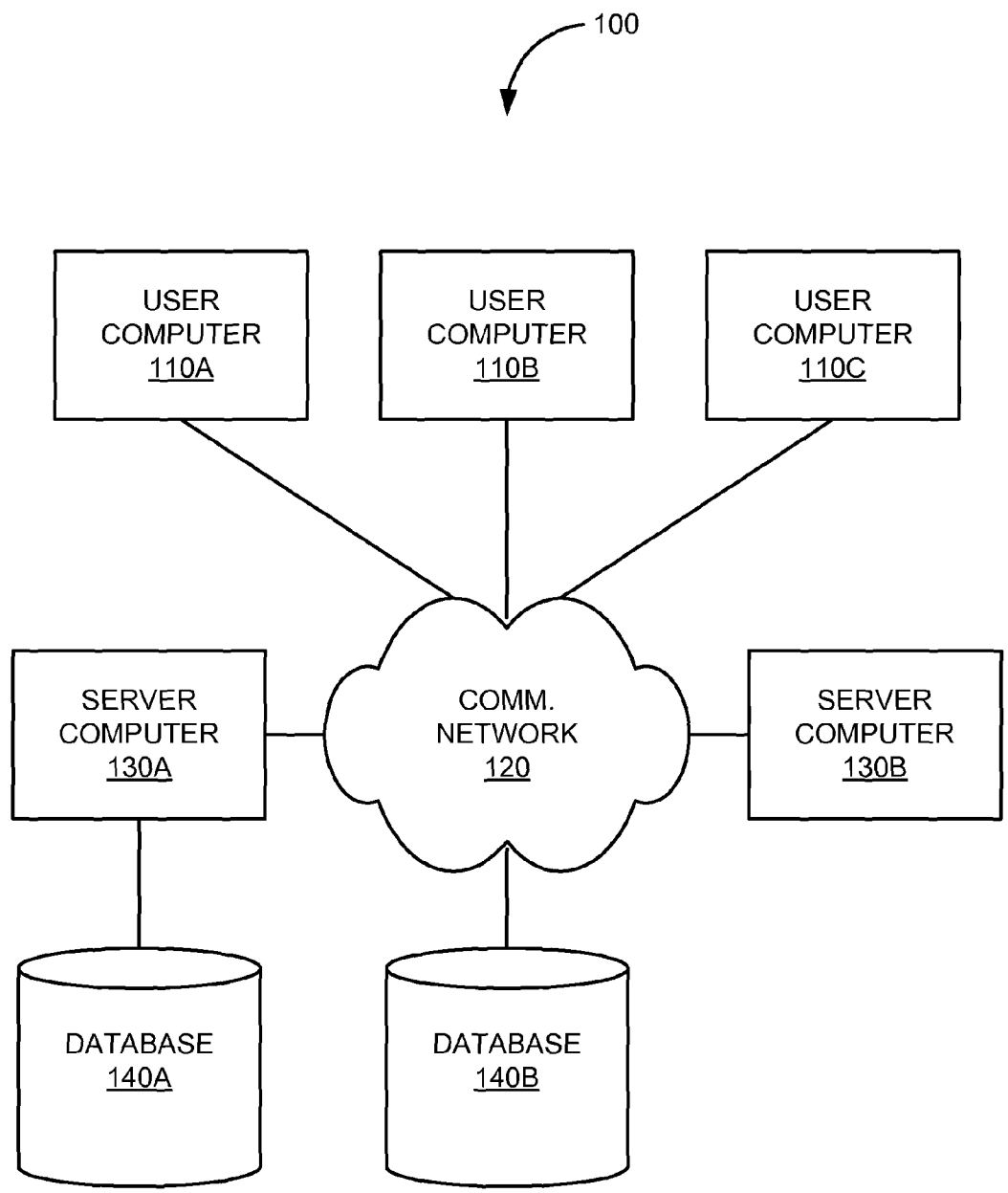
FIG. 1 is a simplified illustration of a system that may incorporate an embodiment of the present invention.

In various embodiments, a master flow controller can branch to a dynamic flow controller for a specific event in an authentication process. The master flow controller saves the state of the plug-in execution before branching the control to the dynamic flow controller. All the attributes stored in the authentication context by the authentication plug-in is saved and synchronized before the control is branched to the child flow controller. After the dynamic flow controller finishes execution, the state information is synchronized between flow controllers The following concerts and definitions are used throughout this disclosure:

Authentication scheme: An authentication scheme protects a resource for a given policy. The scheme is made up of authentication modules. The scheme also has details about the challenge mechanism, which is used to collect the credentials, and details about the type of credential collector that is to be used.

Authentication module: This can be defined as the smallest executable unit of an authentication scheme. This module does the actual authentication against the back-end identity store. A scheme can have one or more authentication modules, and the authentication may be done against one or more identity stores.

Authentication Module plug-in: This module can be customized to perform authentication functionality. Custom plug-ins allow customers to extend the authentication functionality to perform a specific logical unit of authentication.

Authentication module chaining: This is a multi-factor approach, where modules of a similar challenge mechanism are grouped, and the credentials are collected in one pass, and then validated against each module.

Authentication Scheme plug-in: When customers want to chain multiple authentication modules in a new authentication scheme, they can define a new scheme plug-in with the flows in it.

Challenge mechanism: The mechanism used to collect the credentials. The challenge mechanism is typically tied to the authentication scheme. The following mechanisms are examples: FORM, BASIC, X509, WNA, OAM10G, TAP and NONE. The challenge mechanism controls the way in which the required credentials are collected.

Events: Events are the building blocks of an authentication flow. Events may be predefined and/or created from exposed methods of an authentication module plug-in implementation. Events can be combined with rules to build a deterministic workflow for the authentication.

Workflow Controller: The module responsible for orchestrating the deterministic workflow for the authentication. In various embodiments, a workflow controller can use a workflow configuration defined in a workflow definition language. A workflow controller may include master workflow controller and one or more dynamic workflow controllers that orchestrate the workflow.

In various embodiments, access management software is envisioned that provides for authentication module plug-ins that can be customized to allow customers to extend the authentication functionality to perform a specific logical unit of authentication.

FIG. 1 is a simplified illustration of system 100 that may incorporate an embodiment or be incorporated into an embodiment of any of the innovations, embodiments, and/or examples found within this disclosure. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 110 (e.g., computers 110A, 110B, and 110C). User computers 110 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 110 can also have any of a variety of applications, including one or more applications configured to perform methods of the invention, as well as one or more office applications, database client and/or server applications, and web browser applications.

Alternatively, user computers 110 can be any other electronic device, such as a thin-client computer, Internet-enabled mobile telephone, and/or personal digital assistant, capable of communicating via a network (e.g., communications network 120 described below) and/or displaying and navigating web pages or other types of electronic documents. Although the exemplary system 100 is shown with three user computers, any number of user computers or devices can be supported.

Certain embodiments of the invention operate in a networked environment, which can include communications network 120. Communications network 120 can be any type of network familiar to those skilled in the art that can support data communications using any of a variety of commercially available protocols, including without limitation TCP/IP, SNA, IPX, AppleTalk, and the like. Merely by way of example, communications network 120 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 702.11 suite of protocols, the Bluetooth™ protocol known in the art, and/or any other wireless protocol; and/or any combination of these and/or other networks.

Embodiments of the invention can include one or more server computers 130 (e.g., computers 130A and 130B). Each of server computers 130 may be configured with an operating system including without limitation any of those discussed above, as well as any commercially available server operating systems. Each of server computers 130 may also be running one or more applications, which can be configured to provide services to one or more clients (e.g., user computers 110) and/or other servers (e.g., server computers 130).

Merely by way of example, one of server computers 130 may be a web server, which can be used, merely by way of example, to process requests for web pages or other electronic documents from user computers 110. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 110 to perform methods of the invention.

Server computers 130, in some embodiments, might include one ore more file and or/application servers, which can include one or more applications accessible by a client running on one or more of user computers 110 and/or other server computers 130. Merely by way of example, one or more of server computers 130 can be one or more general purpose computers capable of executing programs or scripts in response to user computers 110 and/or other server computers 130, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user computers 110 and/or another of server computers 130.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 110 via a web server (as described above, for example). Similarly, a web server might receive web page requests and/or input data from one of user computers 110 and/or forward the web page requests and/or input data to an application server.

In accordance with further embodiments, one or more of server computers 130 can function as a file server and/or can include one or more of the files necessary to implement methods of the invention incorporated by an application running on one of user computers 110 and/or another of server computers 130. Alternatively, as those skilled in the art will appreciate, a file server can include all necessary files, allowing such an application to be invoked remotely by one or more of user computers 110 and/or server computers 130. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 140 (e.g., databases 140A and 140B). The location of the database(s) 140 is discretionary: merely by way of example, database 140A might reside on a storage medium local to (and/or resident in) server computer 130A (and/or one or more of user computers 110). Alternatively, database 140B can be remote from any or all of user computers 110 and server computers 130, so long as it can be in communication (e.g., via communications network 120) with one or more of these. In a particular set of embodiments, databases 140 can reside in a storage-area network ("SAN") familiar to those skilled in the art. (Likewise, any necessary files for performing the functions attributed to user computers 110 and server computers 130 can be stored locally on the respective computer and/or remotely, as appropriate). In one set of embodiments, one or more of databases 140 can be a relational database that is adapted to store, update, and retrieve data in response to SQL-formatted commands. Databases 140 might be controlled and/or maintained by a database server, as described above, for example.

Figure 2:
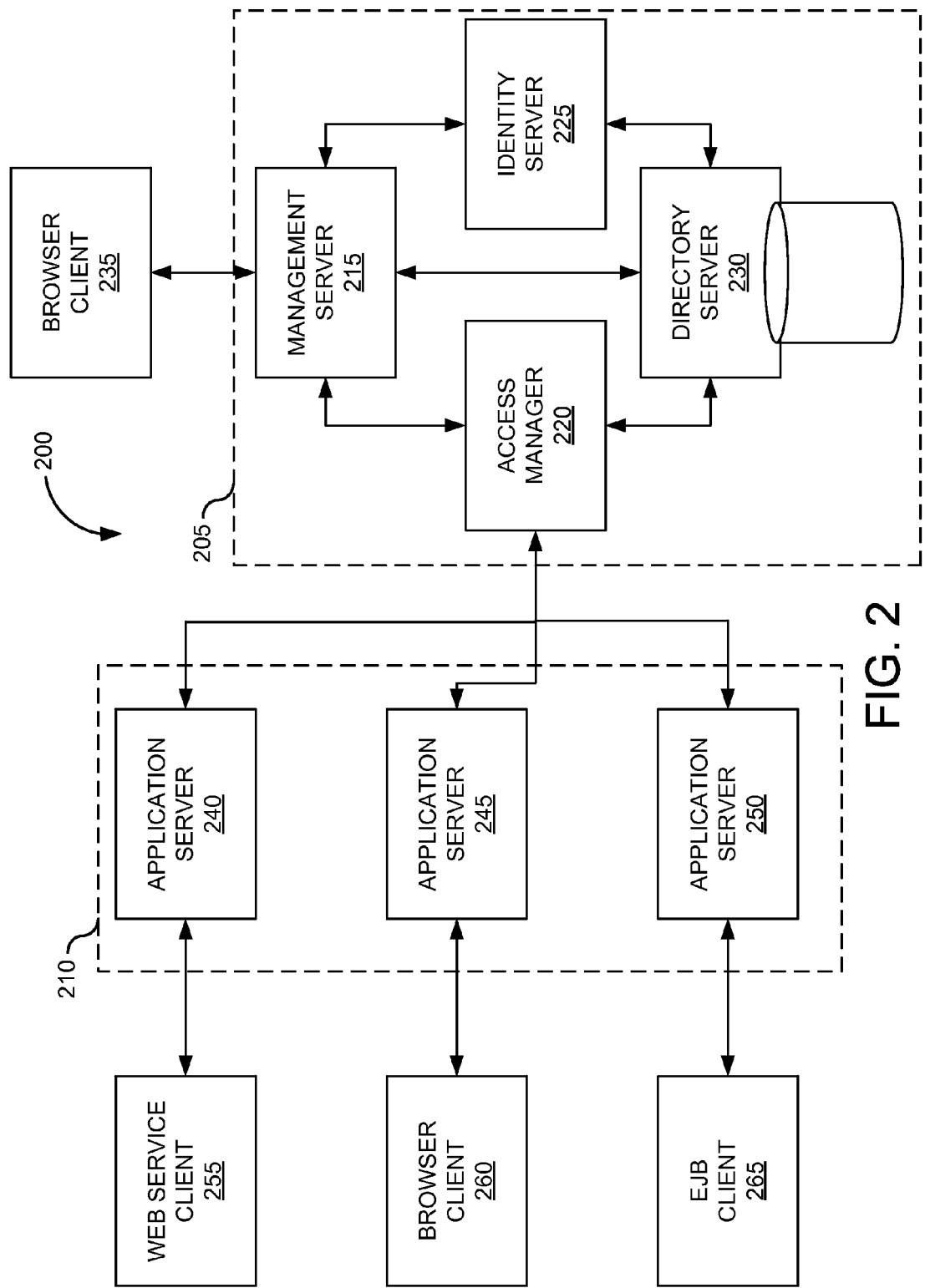
FIG. 2 provides a simple overview of an web access management (WAM) solution in one embodiment.

FIG. 2 provides a simple overview of web access management (WAM) solution 200 in one embodiment. In this example, WAM solution 200 includes access manager cluster 205 that provide the enforcement of access policies to application cluster 210. Access manager cluster 205 includes management server 215, access manager 220, identity server 225, and directory server 230. Access management cluster 205 may be administered by a user using browser client 235.

Application cluster 210 includes application servers 240, 245, and 250. At runtime, enforcement of access policies may be achieved by deployment of "agents" on application servers 240, 245, and 250 to act as Policy Enforcement Points (PEPs) and front-end protected enterprise resources. The agents intercept site traffic and verify that web service client 255, a user associated with browser client 260, and EJB client 265 is authenticated and authorized to access a resource. The first time the user tries to access a resource, if the user is not yet authenticated, the agent redirects the user to a login page or other predetermined authentication workflow entry point managed by access manager 220.

Access manager 220 then validates the user's credentials, such as against identity server 225 or directory server 230. If successfully authenticated, a session gets established on the access manager 220 information communicated to client 255, 260, and 265 that facilitates access for all subsequent requests in that session. In some embodiments, application servers 240, 245, and 250 communicate with access manager 220 using the secure Oracle Access Protocol (OAP). Policies are created and maintained by administrators through management server 215, which acts as a central Policy Administration Point (PAP). These policies can be stored in a Policy Store, for example using a database. As an authenticated user tries to access different applications and resources, access manager 220 acts as Policy Decision Point (PDP) evaluating whether the user is authorized to access a particular resource. It then conveys that information back to the agents for enforcement. In various embodiments, every action gets logged for audit purposes.

Figure 3:
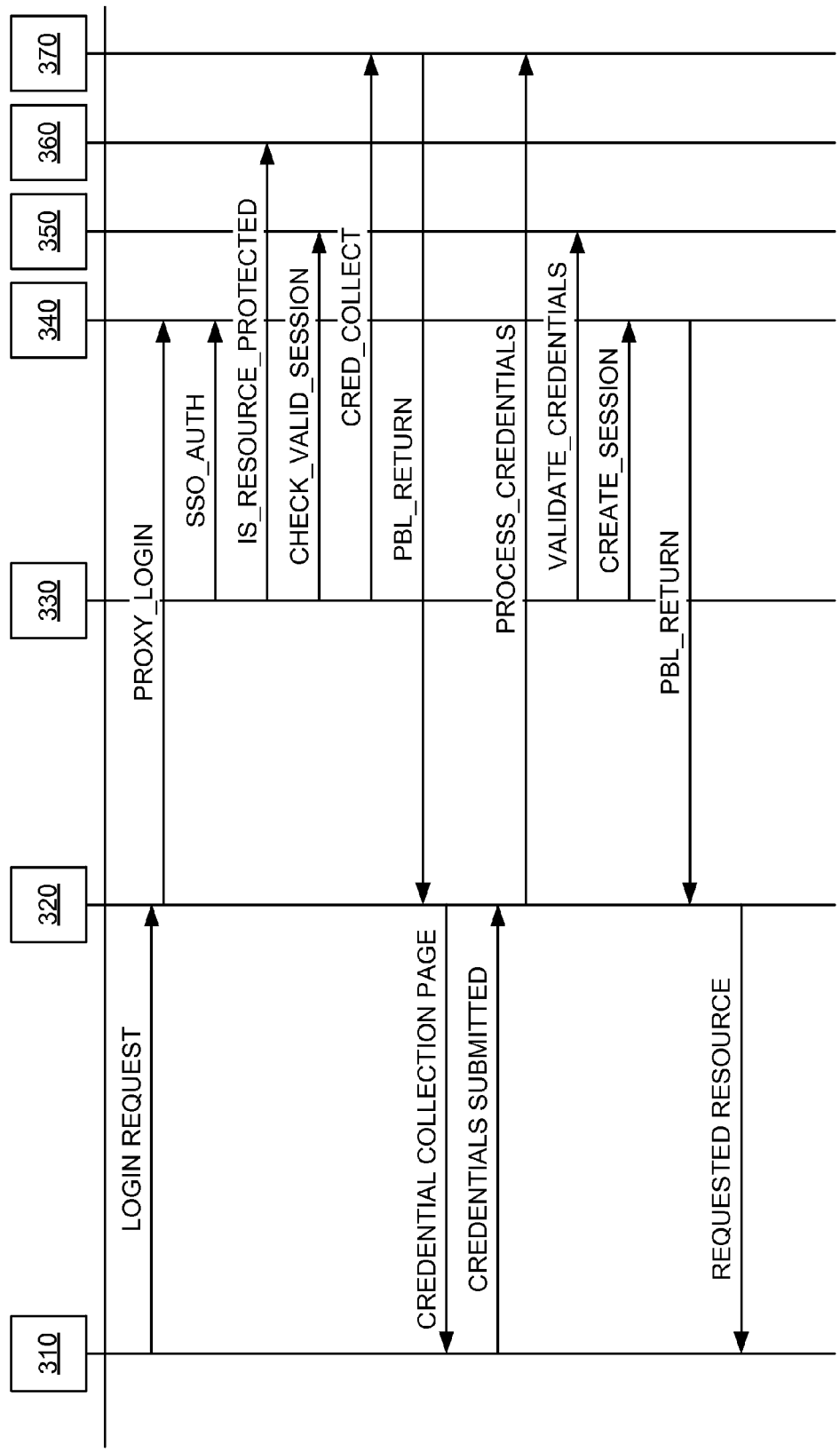
FIG. 3 illustrates a credential collection event in the prior art.

In one scenario, when a user accesses (or attempts to access) a resource that is protected, access manager 220 checks if the resource is protected as a first event fired from a workflow controller. Assuming it is a first time login, detecting the absence of a valid session, a credential collection event is generated and after credentials are collected, these are processed by an event that validates credentials as illustrated in FIG. 3. This is typically of an authentication flow with a static workflow controller. It is the workflow controller that determines the events that need to be executed and the order of these events to complete the authentication process.

For example, when a user of browser 310 accesses a resource that is protected via proxy 320, the first event IS_RESOURCE_PROTECTED from SSOFlowController 330 fires and the general SSO-AUTHN flow comes into play. Here SSOFlowController 30 acts as the flow controller and determines what the next event is and how the authentication flow is managed using SSO engine controller 340, credential collection engine controller 350, AuthZ engine controller 360, and AuthN engine controller 370. Assuming it is a first time login, detecting the absence of a valid session, a CRED_COLLECT event is generated and after credentials are collected, these are processed by VALIDATE_CREDS event via an authentication engine.

In various embodiments, access manager 220 includes a dynamic workflow controller. Therefore, a master controller can delegate the processing of each of these events to a separate flow controller. For example, the master controller can delegate the credential collection to a separate flow controller. This enables the authentication framework to use various credential collection mechanisms and the mechanism can be determined through runtime configuration.

Figure 4:
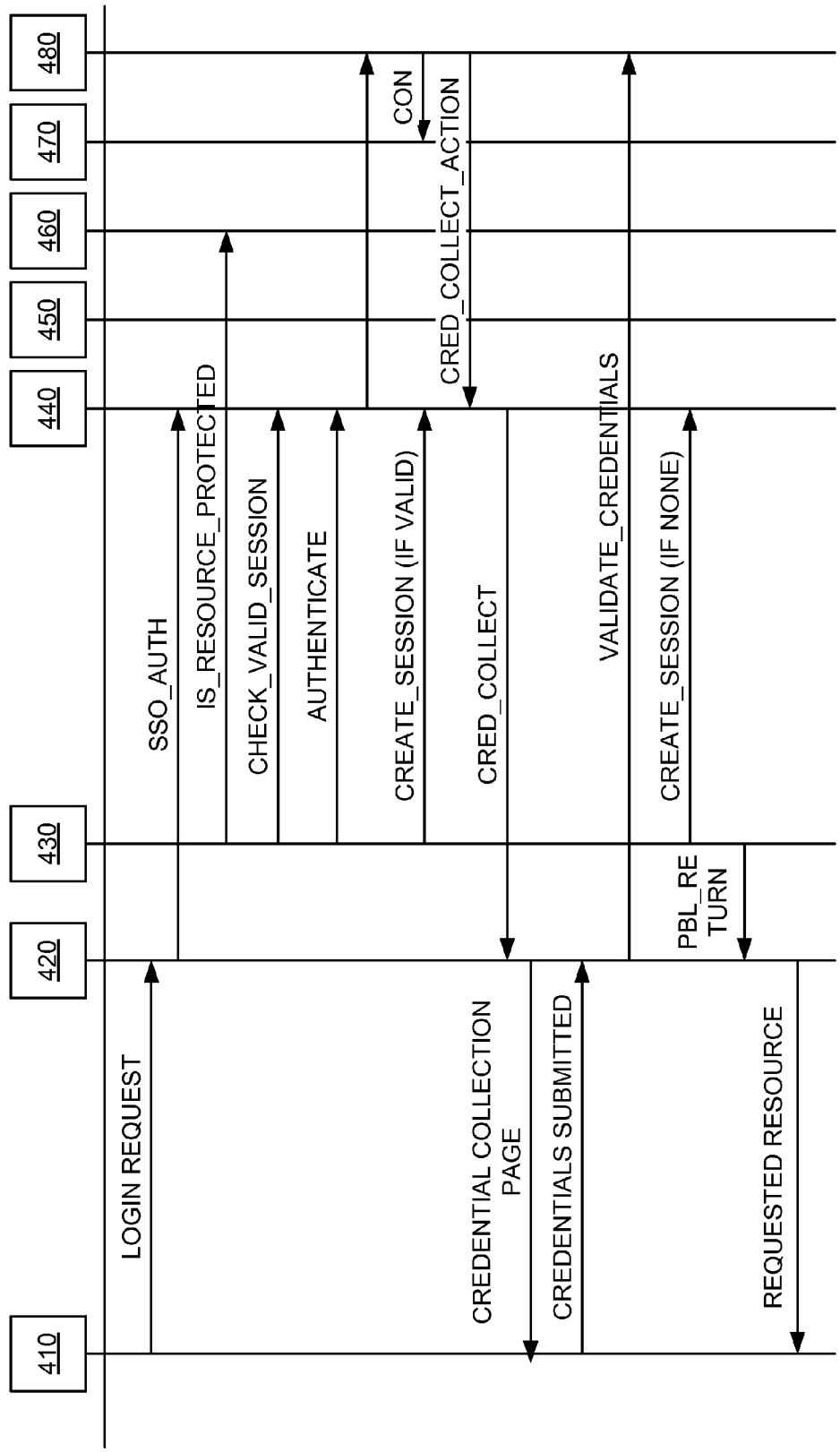
FIG. 4 illustrates a credential collection event using a dynamic flow controller in one embodiment.

FIG. 4 illustrates a credential collection event using a dynamic flow controller in one embodiment. In this example, when a user of browser 410 accesses a resource that is protected using proxy 420, a master workflow controller (e.g., SSO Flow Controller 430) checks if the resource is protected and whether a valid session exists. Once these checks are done (e.g., using SSO engine controller 440, credential collection engine controller 450, AuthZ engine controller 460, and AuthN engine controller 470), the master workflow controller delegates the authentication actions to one or more authentication plug-ins (e.g., plugin 480). An authentication plug-in determines that the credentials need to be collected.

In various embodiments, credential collection is driven by a pluggable dynamic flow controller as the master controller branches to this dynamic flow controller to collect the credentials and validate these credentials. Once the credentials are validated, a dynamic flow controller merges back with the master flow controller with the results of execution. The master flow controller then proceeds with the rest of the events to complete the authentication process. This mechanism can be extended where any of the events in the authentication process can be driven by a dynamic flow controller.

For example, a request to authenticate a user will be passed over to the authentication plug-in. The authentication plug-in will determine if any input is needed for it to continue authentication and if yes, will return the status of execution as "PAUSE." If a valid subject is available, a session is created for the user. This will be used to save the state of execution. Else, the state of execution will be stored in the request object. The session created will be with the lowest Authentication Level (which is typically configurable through global configuration). Once the user authentication is finished, the same session will be updated to a fully valid session with the authentication level as per the scheme and the session timeout configured for access manager 220.

In one aspect, "PAUSE" will have an "ACTION" associated with it and this "ACTION" is based on the "EventHint". "ACTION" has all the information that it needs to execute in "ActionContext", which includes the flow controller this "ACTION" is associated with. The Master Flow Controller saves the state of this execution and branches the control to this dynamic flow controller. Once the events in the dynamic flow controller finish execution, the control is merged back to the parent controller and the state of the execution is updated. Once the authentication is finally complete, the user gets the requested resource.

Figure 5:
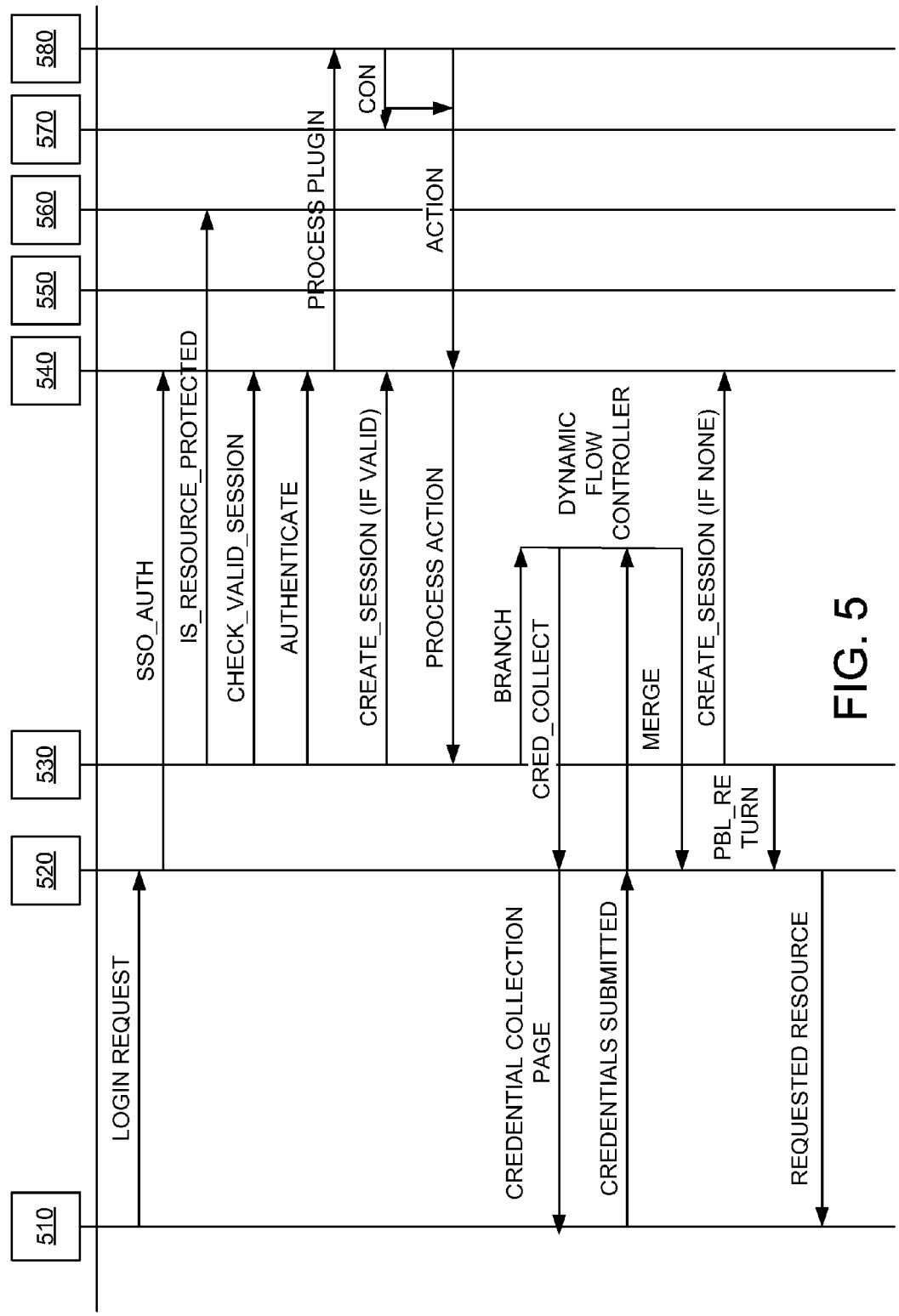
FIG. 5 illustrates a credential collection event using a dynamic flow controller as an "ACTION" in one embodiment.

FIG. 5 illustrates a credential collection event using a dynamic flow controller as an "ACTION" in one embodiment. In this example, when a user of browser 510 accesses a resource that is protected using proxy 520, a master workflow controller (e.g., SSO Flow Controller 530) checks if the resource is protected and whether a valid session exists. Once these checks are done (e.g., using SSO engine controller 540, credential collection engine controller 550, AuthZ engine controller 560, and AuthN engine controller 570), the master workflow controller delegates the authentication actions to one or more authentication plug-ins (e.g., plugin 580. The master flow controller will handle credential collection as a special "ACTION." For example, a request to authenticate a user will be passed over to the authentication plug-in. The authentication plug-in will determine if any input is needed for it to continue authentication and if yes, will return the status of execution as "PAUSE." If a valid subject is available, a session is created for the user. This will be used to save the state of execution. Else, the state of execution will be stored in the request object.

If the "PAUSE" has the "ACTION" as the "CREDCOLLECT_ACTION", the authentication plug-in will pass the "CredentialParameter" objects that is needed by the plug-in to continue authentication. The Master controller internally maps this "CREDCOLLECT_ACTION" to the "CRED_COLLECT" event and proceeds with the collection of credentials specified by the plug-in in the "CredentialParameter" object. Once the authentication is finally complete, the user gets the requested resource.

Figure 6:
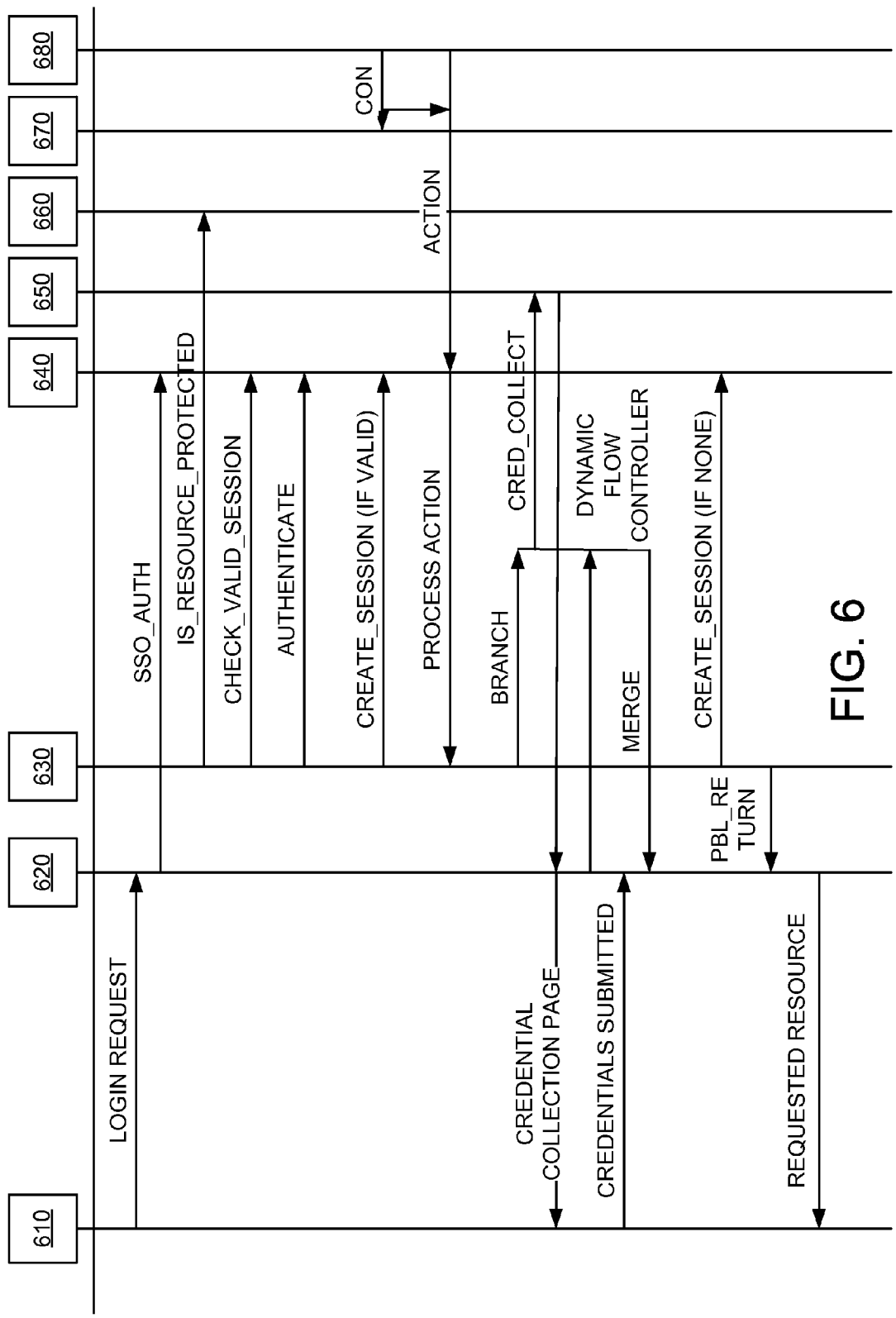
FIG. 6 illustrates another credential collection event using a dynamic flow controller as an "ACTION" in one embodiment.

FIG. 6 illustrates another credential collection event using a dynamic flow controller as an "ACTION" in one embodiment. In this example, when a user of browser 610 accesses a resource that is protected using proxy 620, a master workflow controller (e.g., SSO Flow Controller 630) checks if the resource is protected and whether a valid session exists. Once these checks are done (e.g., using SSO engine controller 640, credential collection engine controller 650, AuthZ engine controller 660, and AuthN engine controller 670), the master workflow controller delegates the authentication actions to one or more authentication plug-ins (e.g., plugin 580. Not only can the master flow controller can branch to a dynamic flow controller for a specific event in an authentication process, but the dynamic flow controller can branch and delegate authentication actions to one or more authentication plug-ins or utilize credential collection engine controller 650, AuthZ engine controller 660, and AuthN engine controller 670.

As discussed above, a master flow controller can branch to a dynamic flow controller for a specific event in an authentication process. The master flow controller saves the state of the plug-in execution before branching the control into the dynamic flow controller. All the attributes stored in the authentication context by the authentication plug-in is saved and synchronized before the control is branched to the child flow controller. Additionally, access manager 220 maintains a request cache to store all the attributes and configure information regarding an authentication request. This request cache can be persisted in multiple ways and is configurable. The request cache can be persisted in a database, cookie etc. The request cache maintains one or more stacks to enable the branching of the flow controller. For example, one stack is used to track all the events executed so far and another stack is used to track the current flow controller.

Figure 7A:
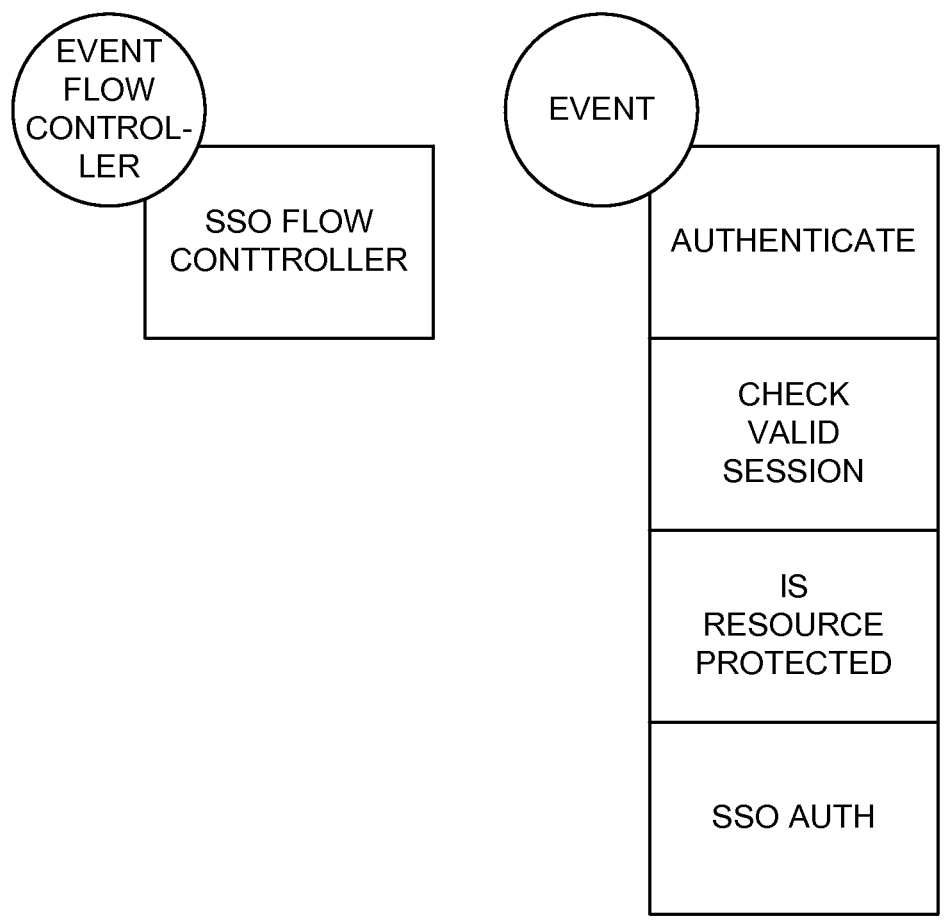
FIG. 7A illustrates state of an event stack and an event flow controller stack before a branch.
Figure 7B:
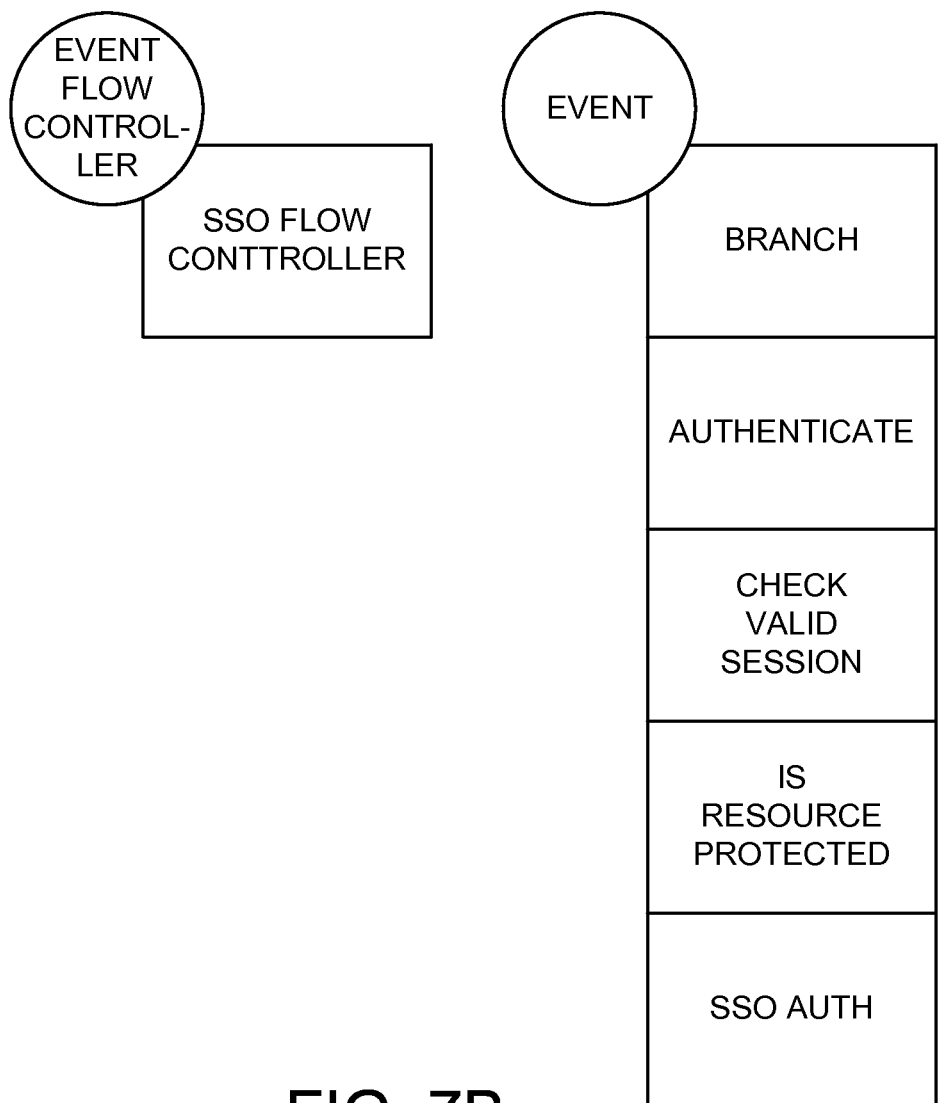
FIG. 7B illustrates state of the event stack and event flow controller stack of FIG. 7A after a branch.

FIG. 7A illustrates the state of an event stack and an event flow controller stack before a branch. FIG. 7B illustrates the state of the event stack and event flow controller stack of FIG. 7A after a branch. In this example, when the master flow controller of access manager 220 branches to the dynamic flow controller, the events stack and the event flow controller stack is updated. The "DynamicFlowController" is pushed to the stack since the top of the event flow controller represents the current flow controller.

Figure 7C:
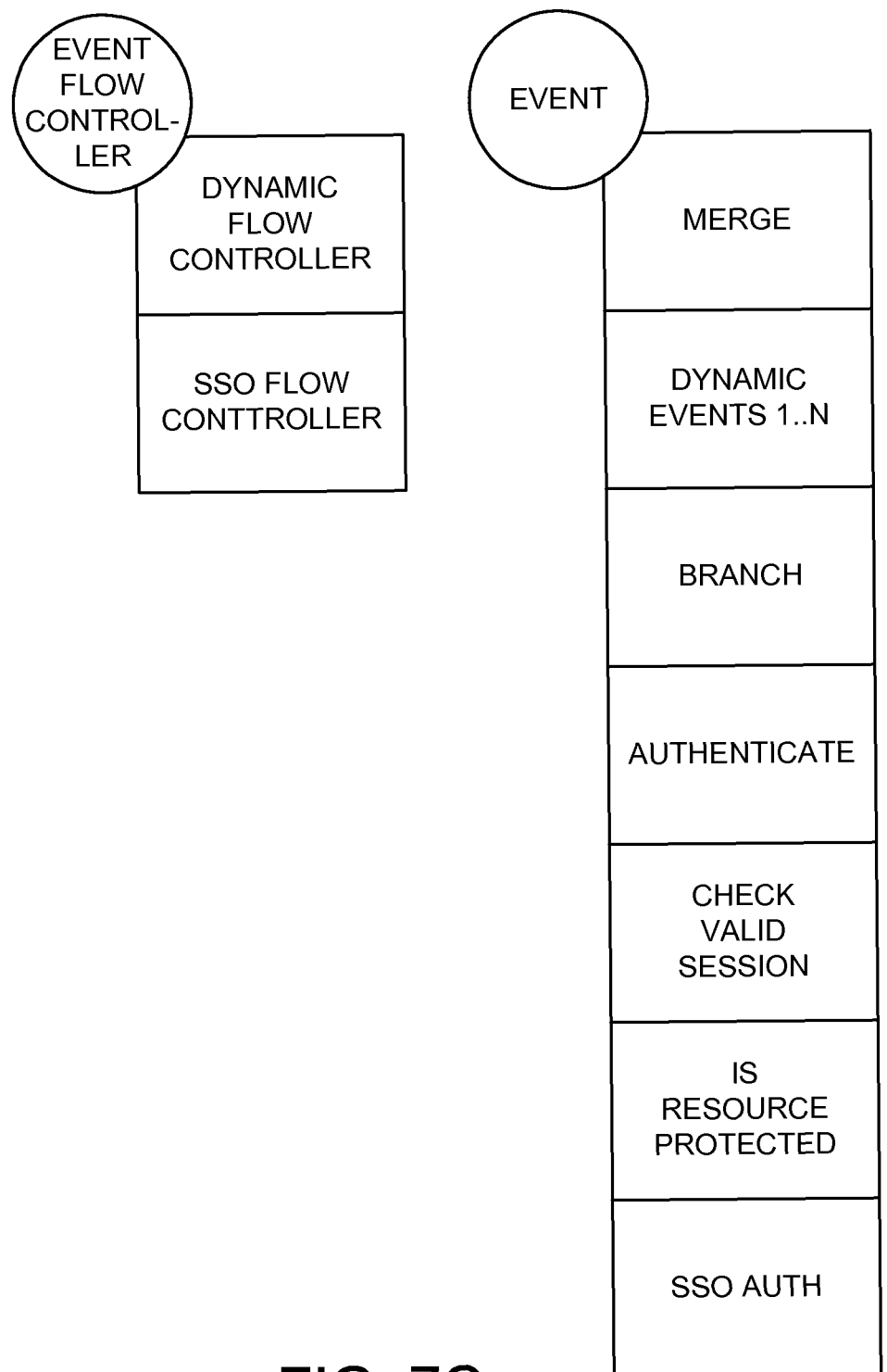
FIG. 7C illustrates the state of the event stack and event flow controller stack of FIG. 7B before merging.

FIG. 7C illustrates the state of the event stack and event flow controller stack of FIG. 7B before merging. For example, after the dynamic flow controller finishes execution, then event flow controller stack and the event stacks need to be updated. The flow controller that has finished execution need to be popped out from the stack and the all the events of the dynamic flow controller must be popped out as well.

Figure 7D:
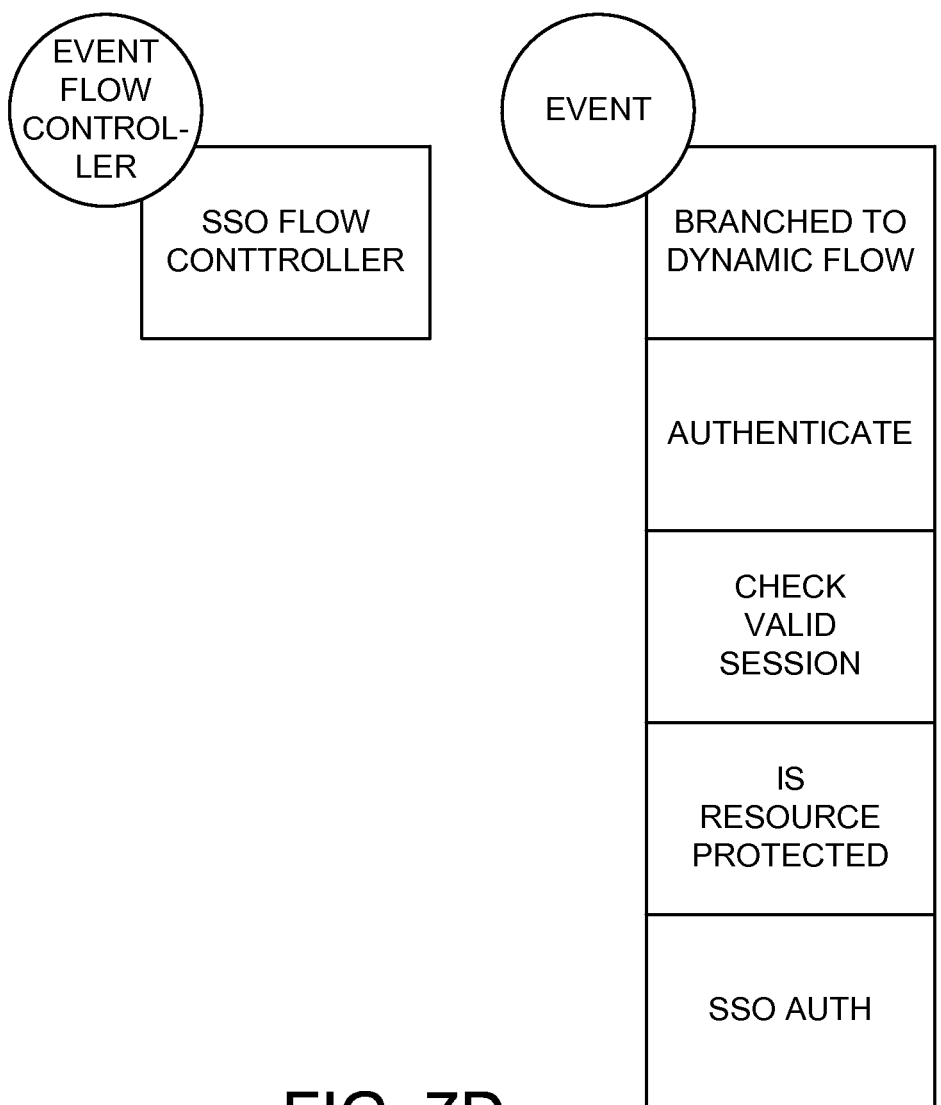
FIG. 7D illustrates the state of the event stack and event flow controller stack of FIG. 7C after merging.

FIG. 7D illustrates the state of the event stack and event flow controller stack of FIG. 7C after merging. For example, once the dynamic flow controller finishes execution, it triggers the merge process. As a part of the merge process, the authentication context is updated with the attributes generated during the dynamic flow controller's execution. The events and the event flow controller stacks are also updated.

Therefore, in various embodiments, rather than having a workflow controller that works only with a static pre-defined configuration, access manager 220 allows new workflows dynamically. An authentication plug-ins can dynamically define workflows that the master controller can branch to and merge from when this dynamic workflow finishes execution. The branch/merge to flow controller can be declarative or can be decided at runtime based on a business use case the authentication plug-in is trying to solve. The dynamic flows can be defined within the authentication plug-in and the framework allows the controller to recursively branch/merge from these dynamically defined workflows.

In some aspects, access manager 220 allows reuse of various authentication flows. A part of an authentication flow, such as a credential collection flow, can be re-used by access manager 220 in various authentication flows by the master controller. In another aspect, access manager 220 provides for logical groupings on authentication events so that the workflow can be broken down into re-usable chunks.

In further embodiments, the branching and merging disclosed above support multi-factor authentication in access manager 220. Multi-factor authentication requires user to present multiple evidences to be authenticated. In one aspect, multi-factor authentication requires an authentication plug-in to transmit information to a backend authentication scheme several times during a login process. The plug-in may fetch information from the schemes. This interaction is supported using a request cache. All the information collected by the plug-in and saved in the context will be available to the plug-in through the authentication process. The context data can also be used to set cookies/headers into a user's login page.

Figure 8:
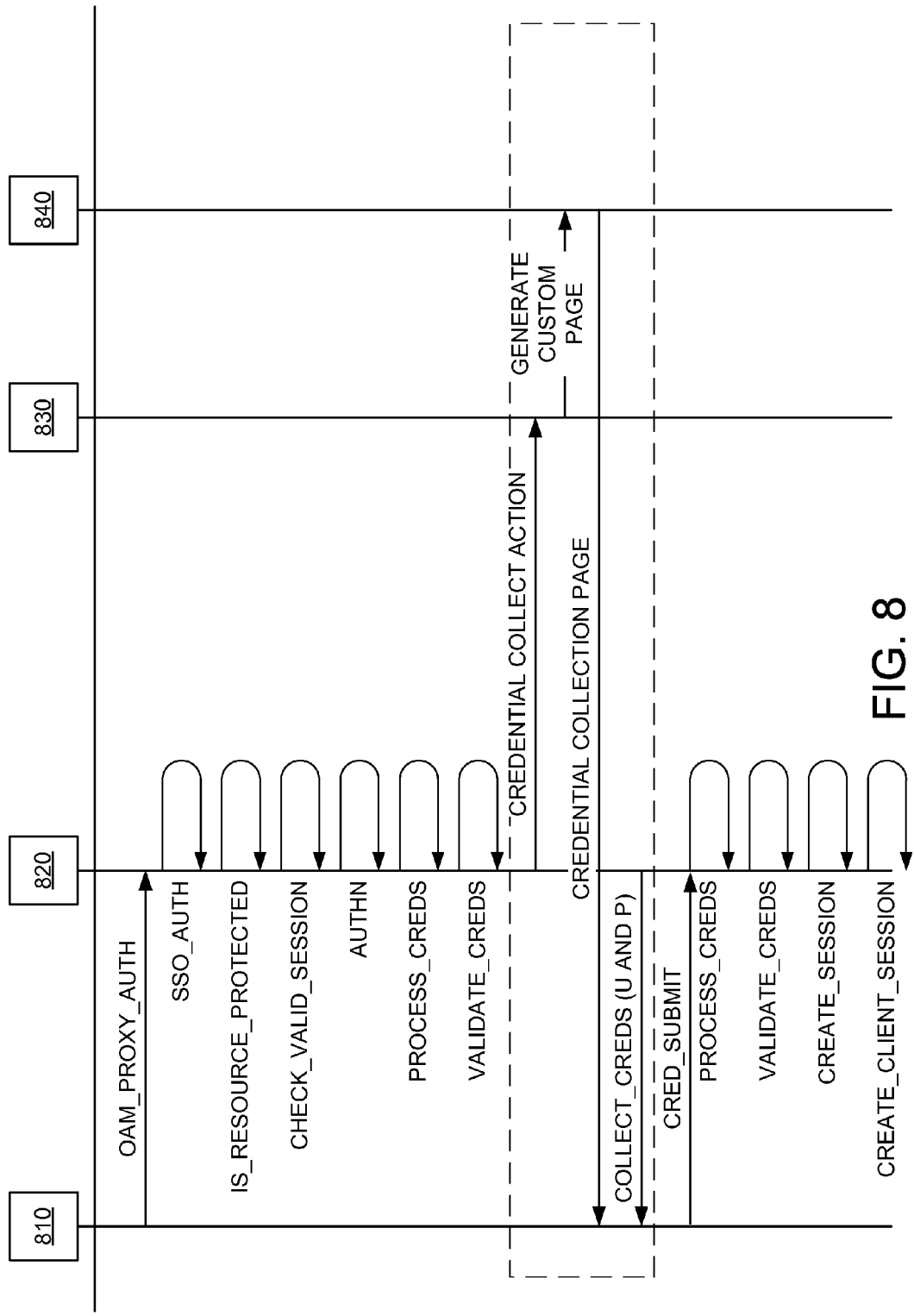
FIG. 8 illustrates a multi-factor authentication flow in one embodiment

FIG. 8 illustrates a multi-factor authentication flow in one embodiment. In this example, after receiving a request to access a protected request using proxy 810, an action "CredentialCollectionAction" is passed by an authentication plugin of engine 820. When the plug-in needs to fetch credentials from the user to continue the authentication process, the plug-in sets the CredentialCollectionAction. For example, if the plug-in requires the UserID and Passcode, the plug-in sets the CredentialCollectionAction with the command "USER_PWD". This command will be translated to CredentialCollectionAction with two CredentialParameter objects—UserID and Passcode. This translation can happen in CredCollectServlet 830.

In one aspects, the plug-in can also set the CredentialCollectionAction with the CredentialParameter objects directly. CredCollectServlet 830 invokes CustomReadServlet 840 to generate the credential collection page with the styling information from the custom HTML. CustomReadServlet 840 reads the custom HTML file and edits this HTML to add the input fields for each of the CredentialParameter object. CustomReadServlet 830 throws this page to the user to collect the required credentials. Credential collector page can also include specific information that needs to be communicated to the user and this information can be selectively displayed based on the command in the Credential collection action.

The following are some examples of credential collection actions that can be supported: CMD_USER_PASSWORD, CMD_RSA_USER_PASSCODE, CMD_RSA_NEXT_TOKEN, CMD_RSA_NEW_PIN, CMD_RSA_SYSGEN_PIN, CMD_RSA_SYSGEN_PIN_CONFIRMATION, CMD_RSA_PASSCODE, CMD_RSA_NEW_PIN_NEXT_TOKEN.

Figure 9:
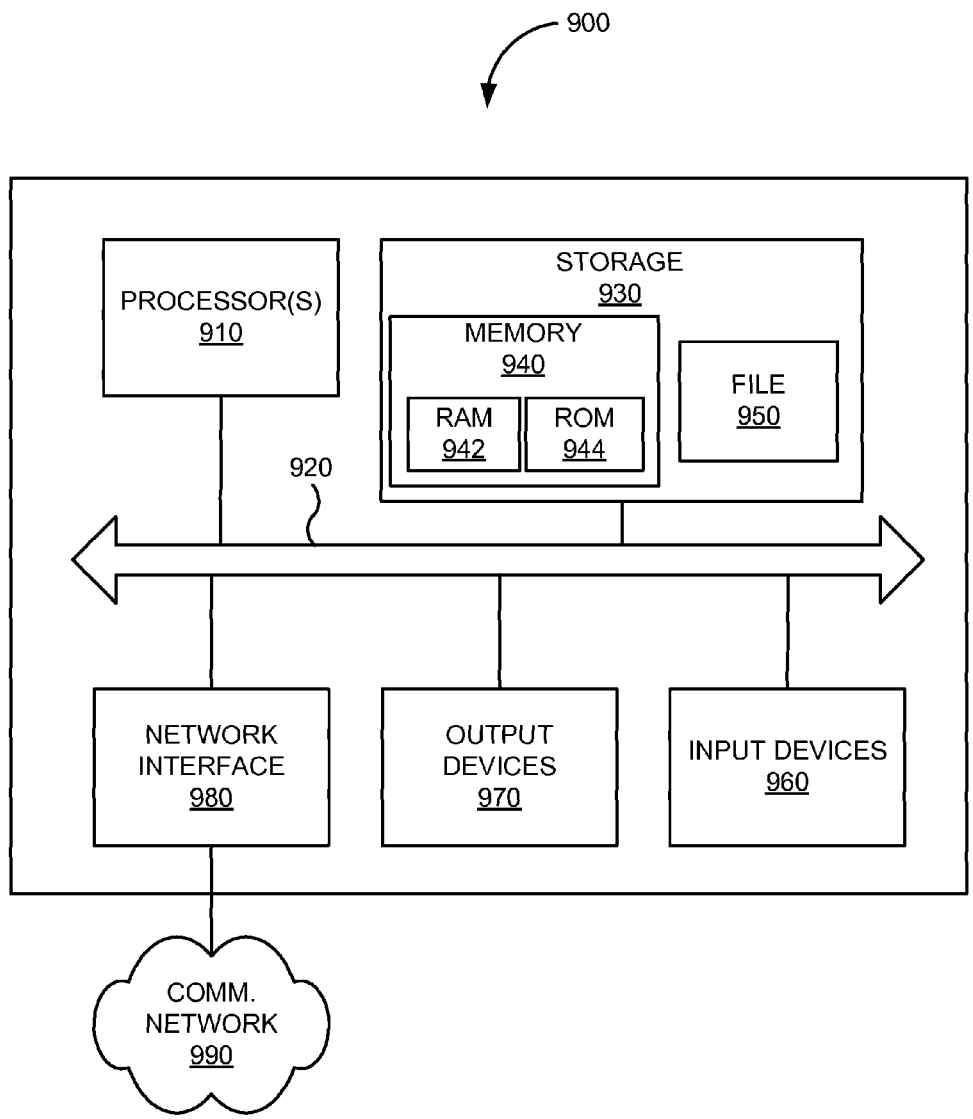
FIG. 9 is a block diagram of a computer system or information processing device that may incorporate an embodiment, be incorporated into an embodiment, or be used to practice any of the innovations, embodiments, and/or examples found within this disclosure.

FIG. 9 is a simplified block diagram of computer system 900 that may be used to practice embodiments of the present invention. As shown in FIG. 9, computer system 900 includes processor 910 that communicates with a number of peripheral devices via bus subsystem 920. These peripheral devices may include storage subsystem 930, comprising memory subsystem 940 and file storage subsystem 950, input devices 960, output devices 970, and network interface subsystem 980.

Bus subsystem 920 provides a mechanism for letting the various components and subsystems of computer system 900 communicate with each other as intended. Although bus subsystem 920 is shown schematically as a single bus, alternative embodiments of the bus subsystem may utilize multiple busses.

Storage subsystem 930 may be configured to store the basic programming and data constructs that provide the functionality of the present invention. Software (code modules or instructions) that provides the functionality of the present invention may be stored in storage subsystem 930. These software modules or instructions may be executed by processor(s) 910. Storage subsystem 930 may also provide a repository for storing data used in accordance with the present invention. Storage subsystem 930 may comprise memory subsystem 940 and file/disk storage subsystem 950.

Memory subsystem 940 may include a number of memories including a main random access memory (RAM) 942 for storage of instructions and data during program execution and a read only memory (ROM) 944 in which fixed instructions are stored. File storage subsystem 950 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 960 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 900.

Output devices 970 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 900.

Network interface subsystem 980 provides an interface to other computer systems, devices, and networks, such as communications network 990. Network interface subsystem 980 serves as an interface for receiving data from and transmitting data to other systems from computer system 900. Some examples of communications network 990 are private networks, public networks, leased lines, the Internet, Ethernet networks, token ring networks, fiber optic networks, and the like.

Computer system 900 can be of various types including a personal computer, a portable computer, a workstation, a network computer, a mainframe, a kiosk, or any other data processing system. Due to the ever-changing nature of computers and networks, the description of computer system 900 depicted in FIG. 9 is intended only as a specific example for purposes of illustrating the preferred embodiment of the computer system. Many other configurations having more or fewer components than the system depicted in FIG. 9 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for managing authentication flows within an access manager that protects access a resource, the method comprising:

receiving, at one or more computer systems, information indicative of an occurrence of a predetermined event in an authentication flow that generates a valid session when an entity has access to the resource;

determining, with one or more processors associated with the one or more computer systems, which authentication plugin to a master authentication flow controller of the access manager is to handle the predetermined event in the authentication flow;

generating, with one or more processors associated with the one or more computer systems, an authentication context at the master flow controller in response to an instruction from the determined authentication plugin, the authentication context of the master flow controller having first authentication information that forms part of the valid session;

initiating, with the one or more processors associated with the one or more computer systems, a branch an authentication context at the master flow controller in response to an instruction from the determined authentication plugin, the authentication context of the master flow controller having first authentication information that forms part of the valid session;

generating, with the one or more processors associated with the one or more computer systems, an authentication context at the determined authentication plugin, the authentication context having second authentication information that forms part of the valid session;

merging, with the one or more processors associated with the one or more computer systems, the second authentication information into the authentication context at the master authentication flow controller; and resuming, with the one or more processors associated with the one or more computer systems, the authentication flow using the second authentication information merged into the authentication context at the master authentication flow controller with the first authentication information.

2. The method of claim 1 wherein receiving, at the one or more computer systems, the information indicative of the occurrence of the predetermined event comprises tracking events in the authentication flow at the master authentication flow controller.

3. The method of claim 1 wherein receiving, at the one or more computer systems, the information indicative of the occurrence of the predetermined event comprises tracking events in another branch authentication flow at the master authentication flow controller or at a dynamic flow controller.

4. The method of claim 1 wherein the authentication context at the master authentication flow controller is persisted as a request cache in a database.

5. The method of claim 1 wherein generating the authentication context at the master authentication flow controller in response to the instruction from the determined authentication plugin comprises receiving an instruction at the master authentication flow controller from the another authentication plugin to pause the authentication flow together with an instruction to perform an action; and wherein determining, with the one or more processors associated with the one or more computer systems, which authentication plugin to the master authentication flow controller of the access manager is to handle the predetermined event in the authentication flow comprises determining that the branch authentication flow is handled by the authentication plugin based on the instruction to perform the action.

6. The method of claim 5 wherein the instruction to perform the action comprises a credential collection action.

7. The method of claim 1 further comprising:
passing one or more objects needed for the branch authentication flow to the determined authentication plugin.

8. A non-transitory computer-readable medium storing computer-executable code for managing authentication flows within an access manager that protects access a resource, the non-transitory computer-readable medium comprising:

code for receiving information indicative of an occurrence of a predetermined event in an authentication flow that generates a valid session when an entity has access to the resource;

code for determining which authentication plugin to a master authentication flow controller of the access manager is to handle the predetermined event in the authentication flow;

code for generating an authentication context at the master flow controller in response to an instruction from the determined authentication plugin, the authentication context of the master flow controller having first authentication information that forms part of the valid session;

code for initiating a branch authentication flow handled by the determined authentication plugin;

code for generating an authentication context at the determined authentication plugin, the authentication context having second authentication information that forms part of the valid session;

code for merging the second authentication information into the authentication context at the master authentication flow controller; and code for resuming the authentication flow using the second authentication information merged into the authentication context at the master authentication flow controller with the first authentication information.

9. The non-transitory computer-readable medium of claim 8 wherein the code for receiving the information indicative of the occurrence of the predetermined event comprises code for tracking events in the authentication flow at the master authentication flow controller.

10. The non-transitory computer-readable medium of claim 8 wherein the code for receiving the information indicative of the occurrence of the predetermined event comprises code for tracking events in another branch authentication flow at the master authentication flow controller or at a dynamic flow controller.

11. The non-transitory computer-readable medium of claim 8 wherein the authentication context at the master authentication flow controller is persisted as a request cache in a database.

12. The non-transitory computer-readable medium of claim 8 wherein the code for generating the authentication context at the master authentication flow controller in response to the instruction from the determined authentication plugin comprises code for receiving an instruction at the master authentication flow controller from the authentication plugin to pause the authentication flow together with an instruction to perform an action; and wherein the code for which authentication plugin to the master authentication flow controller of the access manager is to handle the predetermined event in the authentication flow comprises code for determining that the branch authentication flow is handled by the authentication plugin based on the instruction to perform the action.

13. The non-transitory computer-readable medium of claim 12 wherein the instruction to perform the action comprises a credential collection action.

14. The non-transitory computer-readable medium of claim 8 further comprising:
code for passing one or more objects needed for the branch authentication flow to the determined authentication plugin.

15. A system for managing authentication flows within an access manager that protects access a resource, the system comprising:
a processor; and
a memory storing a set of instructions which when executed by the processor configure the processor to:
receive information indicative of an occurrence of a predetermined event in an authentication flow that generates a valid session when an entity has access to the resource;
determine which authentication plugin to a master authentication flow controller of the access manager is to handle the predetermined event in the authentication flow;
generate an authentication context at the master flow controller in response to an instruction from the determined authentication plugin, the authentication context of the master flow controller having first authentication information that forms part of the valid session;
initiate a branch an authentication context at the master flow controller in response to an instruction from the determined authentication plugin, the authentication context of the master flow controller having first authentication information that forms part of the valid session;
generate an authentication context at the determined authentication plugin, the authentication context having second authentication information that forms part of the valid session;
merge the second authentication information into the authentication context at the master authentication flow controller; and
resume the authentication flow using the second authentication information merged into the authentication context at the master authentication flow controller with the first authentication information.

16. The system of claim 15 wherein to receive the information indicative of the occurrence of the predetermined event the processor is configured to track events in the authentication flow at the master authentication flow controller.

17. The system of claim 15 wherein to wherein receive the information indicative of the occurrence of the predetermined event the processor is configured to tracking events in another branch authentication flow at the master authentication flow controller or at a dynamic flow controller.

18. The system of claim 15 wherein the authentication context at the master authentication flow controller is persisted as a request cache in a database.

19. The system of claim 15 wherein to generate the authentication context at the master authentication flow controller in response to the instruction from the determined authentication plugin the processor is configured to receive an instruction at the master authentication flow controller from the another authentication plugin to pause the authentication flow together with an instruction to perform an action; and
wherein to determine which authentication plugin to the master authentication flow controller of the access manager is to handle the predetermined event in the authentication flow the processor is configured to determine that the branch authentication flow is handled by the authentication plugin based on the instruction to perform the action.

20. The system of claim 15 wherein the processor is further configured to:
pass one or more objects needed for the branch authentication flow to the determined authentication plugin.

* * * * *

UNITED STATES PATENT AND TRADEMARK OFFICE
CERTIFICATE OF CORRECTION

PATENT NO. : 9,092,607 B2  
APPLICATION NO. : 13/632559  
DATED : July 28, 2015  
INVENTOR(S) : Subramanya et al.

Page 1 of 1

It is certified that error appears in the above-identified patent and that said Letters Patent is hereby corrected as shown below:

In the drawings,

On sheet 7 of 12, in FIG. 7A, line 6, delete "CONTTROLLER" and insert -- CONTROLLER --, therefor.

On sheet 8 of 12, in FIG. 7B, line 6, delete "CONTTROLLER" and insert -- CONTROLLER --, therefor.

On sheet 9 of 12, in FIG. 7C, line 9, delete "CONTTROLLER" and insert -- CONTROLLER --, therefor.

On sheet 10 of 12, in FIG. 7D, line 6, delete "CONTTROLLER" and insert -- CONTROLLER --, therefor.

In the specification,

In column 3, line 12, after "resource" insert -- . --.

In column 3, line 54, after "embodiment" insert -- . --.

In column 5, line 56, after "one" delete "ore" and insert -- or --, therefor.

In column 5, line 56, delete "and or/application" and insert -- and/or application --, therefor.

In the claims,

In column 16, line 10, in claim 17, delete "wherein to wherein" and insert -- wherein to --, therefor.

Signed and Sealed this  
Sixteenth Day of August, 2016

Michelle K. Lee  
*Director of the United States Patent and Trademark Office*